March 6, 1934.  O. SAMAD  1,950,194

SAFETY CIRCUIT OPENING DEVICE FOR AUTOMOBILES

Filed March 2, 1931

INVENTOR.
Omin Samad
BY Allen & Allen
ATTORNEYS

Patented Mar. 6, 1934

1,950,194

UNITED STATES PATENT OFFICE 1,950,194

SAFETY CIRCUIT OPENING DEVICE FOR AUTOMOBILES

Omin Samad, Cincinnati, Ohio

Application March 2, 1931, Serial No. 519,469

5 Claims. (Cl. 171—97)

An object of my invention is the provision of safety means whereby the electric current employed in connection with the mechanism of a motor vehicle may be cut off substantially at its source. The need for such a device will be apparent when it is considered that not only is it desirable when storing or leaving the car unprotected to cut off the electric current, but it also sometimes happens that a short circuit or other disturbance in the electrical system necessitates the immediate opening of all circuits. Short circuits are apt to occur in other than switch controlled circuits; and it not infrequently happens that the driver of an automobile in which a short occurs, either has his wiring permanently damaged before a repair man can be summoned, or must lift the floor boards of the car and remove a battery terminal clamp. Incidentally, of course, a switch controlling the entire electrical system of the car will have additional usefulness, as in preventing the unauthorized use of the car.

Another object of my invention is the provision of an inexpensive, but positive and satisfactory construction in a main cut-out switch. Other objects of my invention have to do with the adaptation of a switch structure, adequate as aforesaid, to the various exigencies of use in a motor vehicle, such as the provision of means for permitting the operation of one or more auxiliary circuits.

These and other objects of my invention which will be set forth hereinafter or will be apparent to one skilled in the art upon reading these specifications, I accomplish by that certain construction and arrangement of parts, of which I shall now describe a preferred embodiment, reference being had to the accompanying drawing, wherein.

Figure 1:
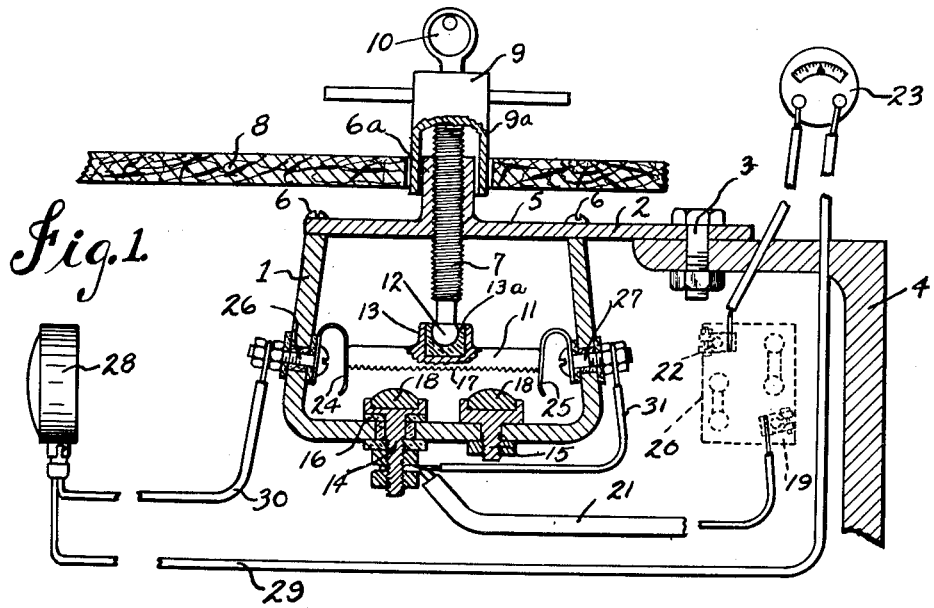
Figure 1 is a sectional view through my device in use.

I provide, in the practice of my invention, a heavy duty switch, having a portion for attachment to the frame of a car or to a member mounted thereon, and in electrical contact therewith, such as the transmission.

The ground lead of the storage battery, instead of being carried directly to the frame of the car is carried directly to my heavy duty switch whereby the said ground connection may be broken, when it is desired entirely to cut off the current supply of the motor car.

My heavy duty switch may comprise a casing of metal 1, having a bottom and four sides, open, however, at the top. An opposed pair of sides, may be and preferably are tapered to give some clearance. I provide an extension 2, by which my switch may be mounted, as by bolts 3, upon a frame member 4 of the car in electrical contact therewith. This extension may be made integral with the body of my switch; but I prefer to make it as part of a cover plate hereinafter to be described. The portion of the car framework upon which my switch is mounted may vary and instead of fastening my switch directly to the frame of the car, I may fasten it to the transmission or to some other portion of the engine structure. For convenience in operating I prefer to locate my switch beneath the floor of the car and to have the operating portion extend through the floor, in a place conveniently accessible to the driver. In order to facilitate the making of electrical connections to my device and in order to keep the length of the cable between it and the source of electrical current as short as possible, I prefer to locate my switch as close to the battery as is consistent with ready access to the working part thereof. Hence I usually either attach the portion 2 of my switch to the frame of the car close to the storage battery or to the transmission, where the working part will extend through the floor close to the gear shift lever.

The top or open portion of my switch housing is closed by a plate 5, which may removably be held in place by screws 6, and with which the extension 2 is preferably integral. The plate is drilled and tapped at its center for the reception of a threaded shaft 7 and there may be about the tapped perforation, a raised boss 6a. The threaded shaft 7 is the operating part of my switch and is shown in Figure 1 as extending through the floor boards 8. Upon its upper end may be fitted an operating handle 9 provided with a lock if desired, actuated by a key 10 in such a way that, when in unlocked position, the handle 9 is fixed upon the shaft 7 so as to impart motion thereto and when in locked position the handle is rotatable with respect to the shaft, but not removable therefrom. The handle may be provided with a skirt 9a of sufficient length to prohibit access directly to the shaft 7.

Since my switch is of the heavy duty type, I prefer to make it as shown in Figure 1, with an operating portion in the form of a metallic or conductive plunger 11, actuated by the shaft 7 which for the purpose is provided with a ball 12 engaging in a socket 13 upon the plunger. It will be clear that upon the rotation of the shaft 7, the plunger 11 may be raised or lowered within the casing 1. I provide two contact members 14 and 15 in the bottom of my switch. These are preferably screw threaded and held by bolts. The contact member 14 should be bushed by insulating members 16 so that it is kept out of contact with the casing 1. The member 15 need not be so bushed, and it will be clear that when contact is established between the members 14 and 15, any lead of an electric circuit connected to the member 14 as a terminal will be effectively grounded. I have found it desirable to provide my plunger with serrations or teeth 17 upon its underside; and to make the tops of my contact members 14 and 15 hollow, filling them with projecting masses 18 of soft metal, such as lead or an alloy. When the plunger 11 is brought into contact with these soft metal masses, it will cut its own contacting surfaces.

The ground terminal 19 of the usual storage battery 20 is connected by means of a cable 21 to the terminal 14 of my switch instead of directly to the ground. The opposite terminal 22 is connected in the usual way to the ammeter 23 or to the several switches upon the car in the ordinary way. When my switch 1 is in the open position the battery will be cut off entirely from the ground and consequently all of the circuits of the car will be dead.

Figure 2:
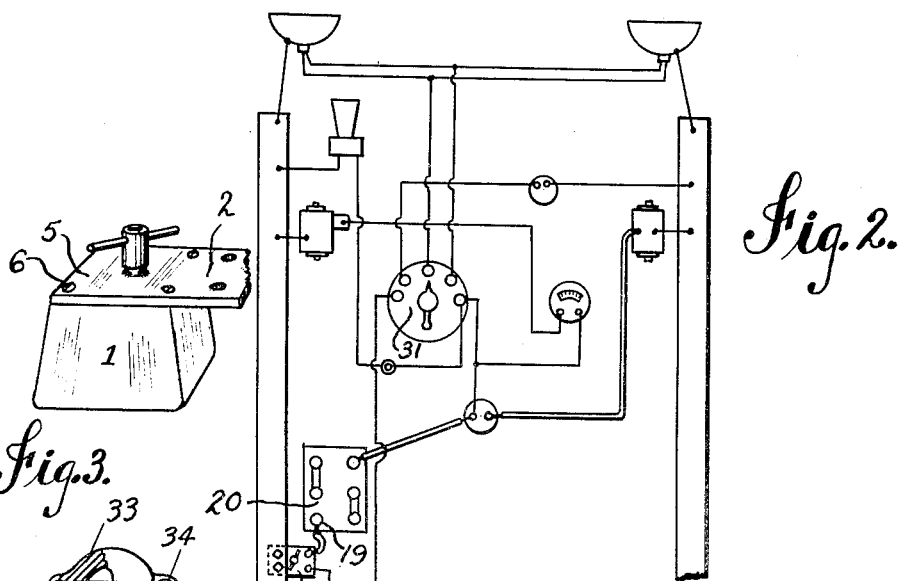
Figure 2 is a wiring diagram of an automobile showing the manner of connecting my device to the main electrical circuit thereof.
Figure 3:
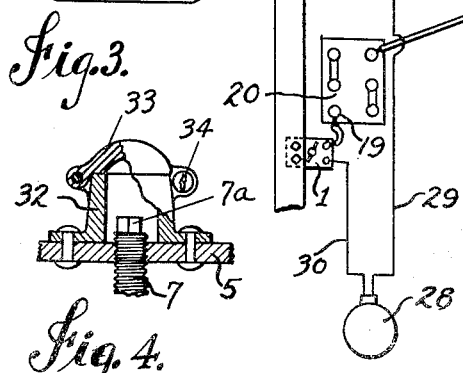
Figure 3 is a perspective view of my device.

Although desiring to cut off all of the other circuits of the car, the driver may wish to leave the tail light burning. I have made provision for this, in the form of my invention shown in Figure 1, by providing oppositely disposed contact members 24 and 25 of spring brass or the like in my casing. These contact members are held by bolts 26 and 27 passing through the walls of my casing and insulated therefrom. Instead of connecting my tail light 28 directly with the ground, I insulate it therefrom and provide it with a pair of leads 29 and 30. The lead 29 may be connected back to the ammeter 23. The lead 30 will go to the bolt 26. A wire 31 may connect the bolt 27 either directly with the ground terminal of the battery or with the contact member 14, as shown in Figure 1. It will be clear that when my plunger 11 is in the position shown in Figure 1, it will make contact between the members 24 and 25 and the tail light 28 will be lighted. It is thus possible to control my tail light entirely from and by means of my safety switch. I prefer, however, to make my tail light controllable in the usual way and for this reason, I prefer to bring the lead 29 back to the usual switch 31 as shown in Figure 2. The contact members 24 and 25 will preferably be made big enough so that contact is established between them by the plunger 11, not only when in the position shown, but also when in its lowermost position, and when establishing contact between the members 14 and 15. The plunger 11 may, however, be raised sufficiently to clear the contact members 24 and 25, in which instance all circuits in the car will be dead. In order that the battery lead may not be grounded with my switch in the position shown, I provide an insulating bushing 13a in the socket 13.

Figure 4:
Figure 4 is a semi-sectional view of one form of locking device applicable to my invention.

Modifications may, of course, be made in my invention without departing from the spirit thereof. A wide variety of locking devices may be employed. I have shown a housing 32 in Figure 4 attached to the cover plate 5 of my switch. The shaft 7 extends within this housing and is provided with a square or other non-circular portion 7a adapted to be engaged by a key. The housing 32 is provided with a cap or cover 33 fitted with a lock 34 whereby access to the shaft 7 may be prevented.

Having thus described my invention, what I claim as new and desire to secure by Letters Patent, is:

1. In a switch for motor vehicles, the combination of a metallic switch body having an extension, adapted to be attached directly to a grounded portion of said vehicle, said switch having means operable to establish contact between a terminal insulated from said switch body and said switch body, said terminal adapted for connection to the ground lead of a storage battery, and a pair of supplementary terminals so arranged with respect to said operable means that contact may be established thereby between said terminals in at least two positions of said operating member.

2. In a switching device, the combination of a motor vehicle and a conductive switch body having means for attachment to a grounded portion of the body of said vehicle, said switch body having a cover, a threaded operating shaft extending through said cover, a plunger attached to said shaft and mounted within said body and a pair of terminals arranged within said body so as to have contact established therebetween by said plunger, said terminals located in the portion of said body opposite said cover and a pair of supplementary terminals located in the side portion of said body and arranged to have contact established therebetween by said plunger.

3. In a switching device, the combination of a motor vehicle and a conductive switch body having means for attachment to a grounded portion of the body of said vehicle, said switch body having a cover, a threaded operating shaft extending through said cover, a plunger attached to said shaft and mounted within said body and a pair of terminals arranged within said body so as to have contact established therebetween by said plunger, said terminals having contact portions of relatively soft metal and said plunger provided with a roughened surface, and oppositely disposed terminals in said portion of said body and having spring parts between which a contact may be established by said plunger, said spring part so disposed and of such length that contact is established therebetween both when said plunger is establishing contact between said first mentioned terminals and when said plunger is removed therefrom, the length of movement of said plunger being such however, as to permit breaking contact between said spring parts.

4. In a motor vehicle, a main heavy duty cutout switch having a conductive body directly grounded to the frame of said vehicle and means to establish contact between a terminal on said body and said body to form a ground connection, a storage battery, a ground lead from one terminal of said storage battery to said terminal and a line lead from the other terminal of said storage battery to the several circuits of said vehicle, said switch having a pair of supplementary terminals between which contact is adapted to be established by the operating part thereof, an ungrounded electrical device such as a tail lamp having one lead, to a line switch and another lead to one of said supplementary terminals, the other of said supplementary terminals being connected to a ground lead from said battery.

5. In a motor vehicle, a main heavy duty-cut-out switch having a conductive body directly grounded to the frame of said vehicle and means to establish contact between a terminal on said body and said body to form a ground connection, a storage battery, a ground lead from one terminal of said storage battery to said terminal and a line lead from the other terminal of said storage battery to the several circuits of said vehicle, said switch having a pair of supplementary terminals between which contact is adapted to be established by the operating part thereof, an ungrounded electrical device such as a tail lamp having one lead to a line switch and another lead to one of said supplementary terminals, the other of said supplementary terminals being connected to a ground lead from said battery, the operating portion of said switch having at least three positions, one of which establishes contact between the main terminal of said switch and said switch body and also contact between said supplementary terminals, another of which establishes contact between said supplementary terminals but not between said main terminal of said switch body, and another of which opens all circuits.

OMIN SAMAD.